United States Patent
Brown

(10) Patent No.: US 6,485,661 B1
(45) Date of Patent: *Nov. 26, 2002

(54) METHOD OF MAKING A COMPOSITE MATERIAL ORTHOTIC INSERT FOR ENHANCED CONTROL AND DURABILITY

(75) Inventor: Dennis N. Brown, Blaine, WA (US)

(73) Assignee: Northwest Podiatric Laboratory, Inc., Blaine, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,862

(22) Filed: Oct. 5, 1999

Related U.S. Application Data

(63) Continuation-in-part of application No. 08/892,763, filed on Jul. 14, 1997, now Pat. No. 5,960,566, which is a continuation of application No. 08/699,202, filed on Aug. 19, 1996, now abandoned, which is a continuation of application No. 08/253,388, filed on Jun. 3, 1994, now abandoned.

(51) Int. Cl.⁷ ............................................. B29C 43/20
(52) U.S. Cl. ...................... 264/162; 264/223; 264/258; 264/294; 264/DIG. 30; 264/DIG. 59; 156/221; 156/245
(58) Field of Search ................................. 264/257, 258, 264/222, 223, 294, DIG. 30, DIG. 59; 156/221, 245

(56) References Cited

U.S. PATENT DOCUMENTS

| | | | | |
|---|---|---|---|---|
| 3,876,389 A | * | 4/1975 | Chaudhari et al. | 29/191.2 |
| 4,597,196 A | * | 7/1986 | Brown | 36/44 |
| 4,610,101 A | * | 9/1986 | Brown | 36/44 |
| 4,611,413 A | * | 9/1986 | Brown | 36/44 |
| 4,612,713 A | * | 9/1986 | Brown | 36/44 |
| 4,628,621 A | * | 12/1986 | Brown | 36/44 |
| 4,654,984 A | * | 4/1987 | Brown | 36/44 |
| 4,688,338 A | * | 8/1987 | Brown | 36/44 |
| RE32,698 E | * | 6/1988 | Brown | 36/44 |
| 4,813,090 A | * | 3/1989 | Ibrahim | 12/142 N |
| 5,312,669 A | * | 5/1994 | Bedard | 428/105 |
| 5,571,607 A | * | 11/1996 | Blakeman et al. | 428/246 |
| 5,772,945 A | * | 6/1998 | Brown | 264/258 |

FOREIGN PATENT DOCUMENTS

GB      2230935 A    * 11/1990

* cited by examiner

Primary Examiner—Stefan Staicovici
(74) Attorney, Agent, or Firm—Todd N. Hathaway

(57) ABSTRACT

A composite material blank for an orthotic insert. The device is formed of layers of fiberglass and graphite fiber material. A first graphite fiber layer provides the overall structure with increased strength, while secondary graphite fiber reinforcement strips are arranged below the first and fifth rays of the foot to provide additional rigidity and control in these areas. The edges of the graphite fiber layers are recessed inwardly from the edges of the fiberglass layers so as to provide a graphite-free border which prevents cracks from propagating into the graphite fiber layers. The layers are bonded together by heat curing over molds.

7 Claims, 6 Drawing Sheets

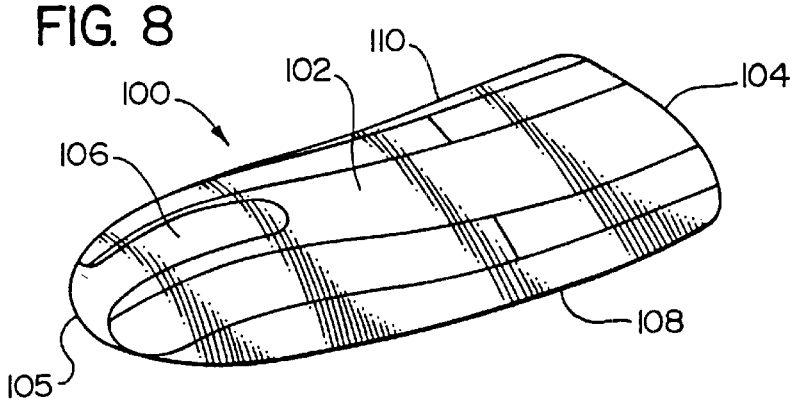
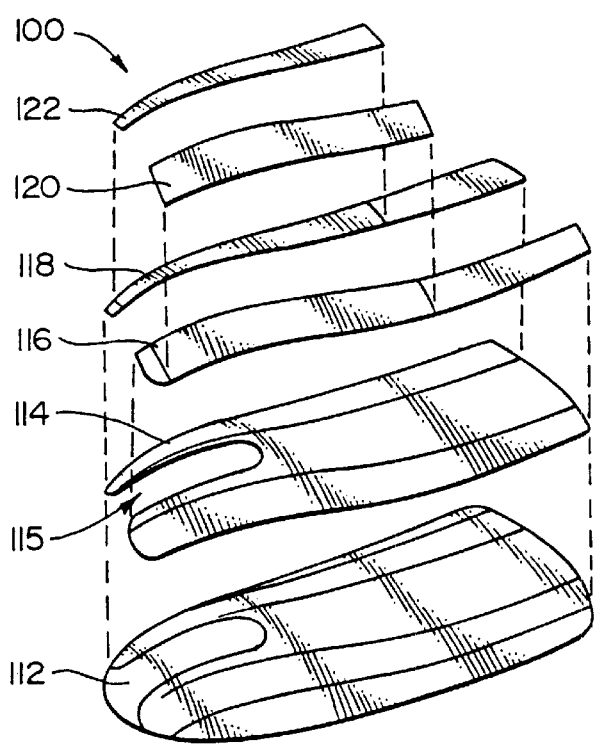
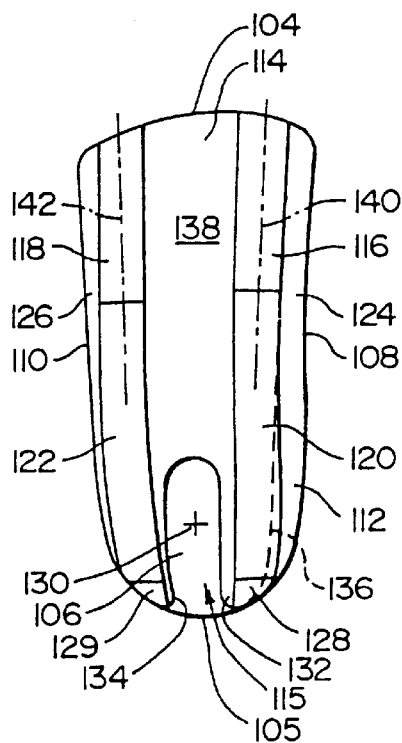

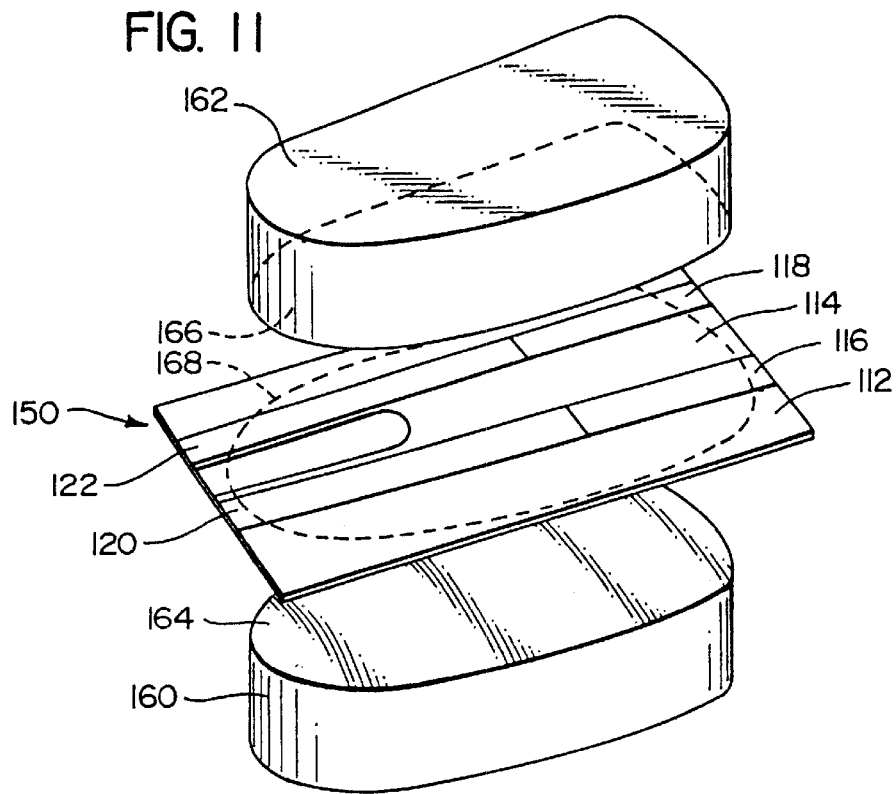
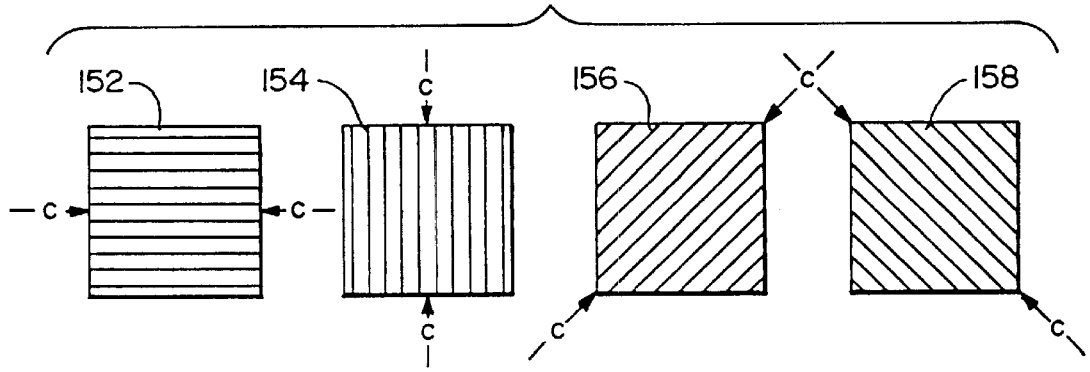

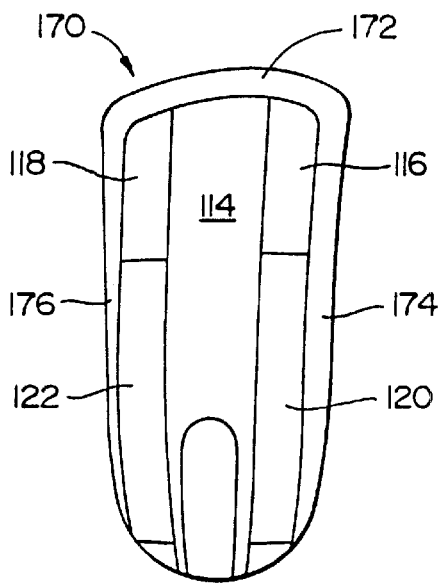
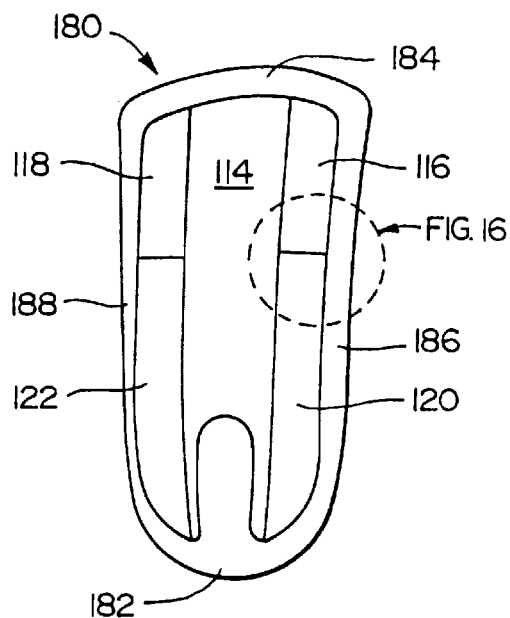
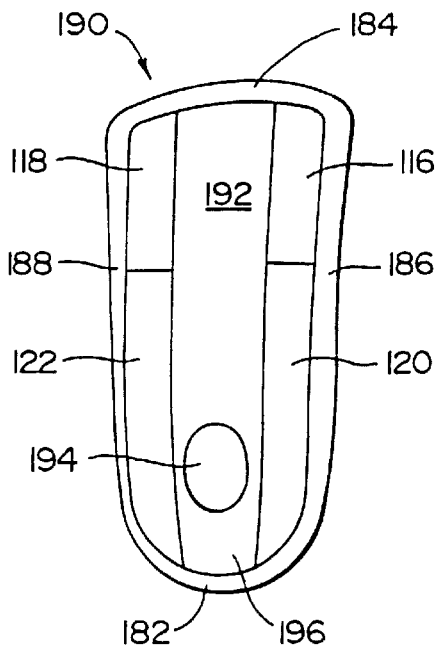
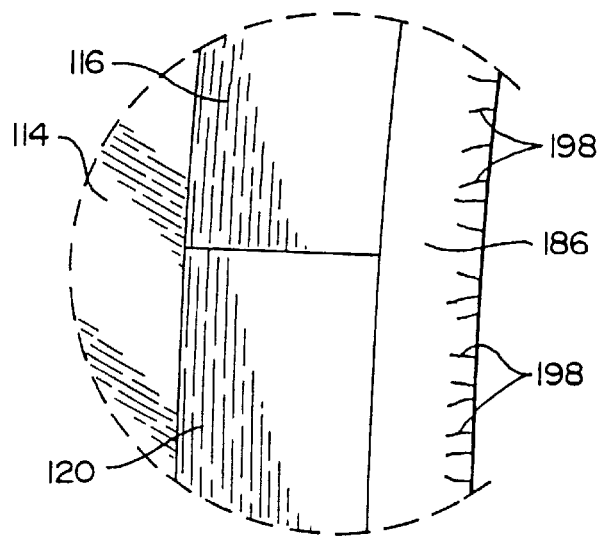

METHOD OF MAKING A COMPOSITE MATERIAL ORTHOTIC INSERT FOR ENHANCED CONTROL AND DURABILITY

This is a Continuation-in-Part of U.S. patent application Ser. No. 08/892,763, filed Jul. 14, 1997, now U.S. Pat. No. 5,960,566, which is a continuation of U.S. patent application Ser. No. 08/699,202, filed Aug. 19, 1996, now abandoned, which is a continuation of U.S. patent application Ser. No. 08/253,388, filed Jun. 3, 1994 now abandoned.

BACKGROUND OF THE INVENTION

1. Field of the Invention

The present invention relates generally to orthotic inserts for use in conjunction with various types of footwear. More particularly, the present invention relates to an orthotic insert constructed of layers of fiberglass and graphite fiber materials, with the graphite layers being configured to provide enhanced control over the motions of the foot, and the device further being particularly configured to provide a long service life without cracking.

2. Background
a. Orthotic Devices

Orthotic inserts are used in conjunction with various types of footwear to enhance the functions of a person's foot. An orthotic insert can be either soft or hard: a hard insert is a substantially rigid member, desirably having a relatively thin vertical thickness dimension and extending from the calcaneal area of the foot (the heel portion) to at least the metatarsal head area of the foot (i.e., the "ball" of the foot). In general, the purpose of the rigid orthotic (sometimes called a "functional orthotic") is to first position, and then control the movements of, the midtarsal and subtalar joints during the gait cycle which the body goes through in walking and running, and possibly other weight bearing activities.

b. The Gait Cycle

Before proceeding with a discussion of prior orthotic devices and the problems which have been encountered with the same, the "gait cycle" will be discussed here so as to provide an improved understanding of the function of the present invention. The discussion will include the following: (i) the main components of the human leg and foot, and how these function relative to one another; (ii) the gait cycle which a person goes through in a normal walking motion; and (iii) the intended function of a rigid orthotic in optimizing the coordinated operation of the person's foot and leg throughout the gait cycle.

(i) The Main Components of the Human Leg and Foot and How These Function Relative to One Another FIGS. 1–3 show a typical human foot 10 and (in FIGS. 2–3) the lower part 12 of the leg 14. The two lower bones of the leg are the tibia 16 and the fibula 18. Below the tibia and fibula, there is the talus 20 (i.e. the "ankle bone"). Positioned below and rearwardly of the talus 20 is the calcaneus 22 (i.e. the "heel bone"). Positioned moderately below and forward of the talus 20 is the navicular 24 and forward of the calcaneus is the cuboid 26. Extending forwardly from the navicular are the three cuneform bones 28. Extending forwardly from the cuneform bones and the cuboid are the five metatarsals 30. Forwardly of the metatarsals are the phalanges 32 which make up the five toes 34.

The movement of the talus 20 relative to the tibia 16 and fibula 18 is such that it enables the entire foot to be articulated upwardly and downwardly (in the motion of raising or lowering the forward part of the foot). However, the talus is connected to the tibia and fibula in such a way that when the entire leg is rotated about its vertical axis (i.e. the axis extending the length of the leg), the talus 20 rotates together with the leg 14.

With regard to the relationship of the talus to the calcaneus, these two move relative to one another about what is called the "subtalar joint" indicated at 36. The subtalar joint can be described generally as a hinge joint about which the talus and calcaneus articulate relative to one another. On average, the hinge axis extends upwardly and forwardly at a slant angle of about 42° from the horizontal, and also slants forwardly and inwardly at about 16° from a straightforward direction. There is also a midtarsal joint 38, and this will be discussed later.

To explain further the hinge motion of the subtalar joint, reference is now made to FIGS. 4a and 4b. The talus can be considered as a vertical board 40, and the calcaneus as a horizontally extending board 42, these being hinge connected to one another along a diagonal hinge line 44, with this hinge line corresponding to the subtalar joint 36. It can be seen with reference to FIG. 4a that as the talus is rotated inwardly about its vertical axis (i.e. the front part of the leg is rotated toward the center of the person's body), there is a corresponding rotation of the calcaneus (i.e. the horizontal board 42) about a horizontal axis. It can be seen in FIG. 4b that an opposite (i.e. outward) rotation of the talus (i.e. the vertical board 40) causes a corresponding rotation of the calcaneus (i.e. the horizontal board 42) in the opposite direction to that shown in FIG. 4a.

With regard to the midtarsal joint 38, this is in reality composed of two separate joints, the talo-navicular and the calcaneal-cuboid. It is a complex joint, and no attempt will be made to illustrate or recreate its motion accurately. Instead, a somewhat simplified explanation will be presented as it relates to the present invention.

The main concern relative to the midtarsal joint is not the precise relative motion of the parts of the foot which make up this joint, but rather the locking and unlocking of the joint which occurs when there is an outward motion of the leg and talus and an opposite inward motion, respectively. When the leg is rotated inwardly, the midtarsal joint 38 is in its unlocked position so that the portion of the foot 10 forwardly of the joint (i.e. the midfoot 45) is flexible, this being the "pronated" position of the foot. On the other hand, when the leg and talus are rotated outwardly, the foot is said to be "supinated" and the midtarsal joint is in its locked position and the midfoot is essentially a part of a rigid lever. In actuality, the midfoot never becomes completely rigid, so that even in the totally supinated position, there is some degree of flexibility in the midfoot.

This function of the midtarsal joint will now be explained relative to FIGS. 5a and 5b. It can be seen that FIGS. 5a–b are generally the same as FIGS. 4a–b, except that a forward board member 46 is shown to represent the midfoot 45, this member 46 having a downward taper in a forward direction, and also a lower horizontal plate portion 48. This plate portion 48 is intended to represent that the plantar surface (i.e. the lower support surface) of the midfoot 45 engages the underlying support surface in a manner so as to remain generally horizontal to the support surface.

It can be seen that when the two board members 40 and 42 are in the pronated position of FIG. 5a, the midtarsal joint represented at 50 in FIGS. 5a–b is in a first position which will be presumed to be in unlocked position. In the unlocked position of FIG. 5a, the member 46 is not rigid with the horizontal member 42, and the forward member 46 can flex upwardly relative to the horizontal member 42. (This is the pronated position of the foot 10.) However, in the position of FIG. 5b, the board members 46 and 42 will be presumed to be locked to one another so that the members 42 and 46 form a unitary lever. For ease of illustration, no attempt has been made to illustrate physically the unlocking relationship of FIG. 5a and the locking relationship of FIG. 5b. Rather, the illustrations of FIGS. 5a–b are to show the relative movements and positions of these components, and the locking and unlocking mechanism is presumed to exist.

(ii) The Gait Cycle Which the Person Goes Through in a Normal Walking Motion

Reference is first made to FIGS. 6a and 6b. As illustrated in the graph of FIG. 6a, during the normal walking motion, the hip (i.e. the pelvis) moves on a transverse plane, and this movement in the gait cycle is illustrated in FIG. 6b. Also, the femur (i.e. the leg bone between the knee joint and the hip) and the tibia rotate about an axis parallel to the length of the person's leg. It is this rotation of the leg about its vertical axis which is intrinsically related to the pronating and supinating of the foot during the gait cycle, and this will be explained in more detail below.

There is also the flexion and extension of the knee, as illustrated in the five figures immediately below the graph of FIG. 6a. Further, there is the flexion and extension of the ankle joint. At the beginning of the gait cycle, the heel of the forwardly positioned leg strikes the ground, after which the forward part of the foot rotates downwardly into ground engagement. After the leg continues through its walking motion so as to extend rearwardly, the person pushes off from the ball of the foot as the other leg comes into ground engagement.

The motions described above are in large part apparent from relatively casual observation. However, the motion which is generally overlooked by those not familiar with the gait cycle is the inward and outward rotation of the leg about its lengthwise axis which must occur with the pronating and supinating of the foot. This will be described relative to FIG. 7a and FIG. 7b.

At initial ground contact the leg is rotated moderately to the outside (i.e. the knee of the leg is at a more outward position away form the centerline of the body) so that the foot is more toward the supinated position (i.e. closer to the position shown in FIG. 4b). Consequently, the initial heel strike and loading of the foot takes place on the lateral (i.e. outer) side of the heel, and the calcaneus is normally inverted by approximately 2° at heel contact. Immediately following heel strike and up to the 25% position, the leg rotates about its vertical axis in an inward direction so that the subtalar joint pronates. This pronation motion of the subtalar joint results in 4–6° of eversion of the calcaneus, and ultimately this bone rests an average of 2–4° degrees everted to the vertical when the 25% stance position is reached. The effect of this is to rotate the heel of the foot so that the center of pressure moves from a lateral heel location toward a location nearer the centerline of the foot, as indicated at 54 in FIG. 7b. Also, the pronating of the subtalar joint produces a degree of relaxation of the midtarsal joint 38 and subsequent relaxation of the other stabilization mechanisms within the arch of the foot. Furthermore, this inward rotation of the leg serves as a torque converter; the internal rotation takes the vertical force of the leg at heel contact and converts this into a frontal plane force which extends the relaxed foot. From the foregoing, it will be understood that shock absorption at heel contact is thus primarily a function of controlled pronation of the foot during the first 25% of the stance phase.

With further movement from the 25% to the 75% position, the leg rotates in an opposite direction (i.e. to the outside), and the subtalar joint becomes supinated at the 75% position of FIG. 7a. This functionally locks the midtarsal joint so that the person is then able to operate his foot as a rigid lever so as to raise up onto the ball of the foot and push off with this as the other leg moves into ground contact.

With reference again to FIG. 7b, the initial pressure point at ground contact is at 52, and moves medially across the heel to the location at 54. Thereafter, the pressure center moves rather quickly along broken line indicated at 56 toward the ball of the foot. As the person pushes off of the ball of the foot and to some extent from the toes, the pressure moves to the location at 58. Accordingly, it will be appreciated that the pressure point or center shifts from the lateral portion of the foot to the medial portion in the course of the normal gait cycle.

(iii) The Intended Function of the Orthotic to Improve Operation of the Person's Foot and Leg Throughout the Gait Cycle A primary function of most orthotic inserts is to initially position the plantar surface of the calcaneus 22 and the midfoot 45 so that the subtalar and midtarsal joints 36 and 38 are positioned in the proper functional relationship for the person's foot, and to thus control the motion of the foot parts and the leg and hip throughout the gait cycle. It will be understood that if the components of the foot have the proper initial position and movement about the subtalar and midtarsal joints, the entire gait cycle, all the way from the coordinated rotation of the hips through the flexion and rotation of the leg, and also from the initial heel strike to the final toe-off, will be properly coordinated and balanced for optimum movement.

The only practical way that a foot can be controlled in this manner is by a three dimensional member which properly conforms to the foot's plantar surface. The insoles of mass-produced shoes, however, do not ordinarily conform to the plantar surface of any particular foot so as to optimally locate its components. Accordingly, it has been the practice for many years to provide an orthotic insert which engages both the shoe and the foot in a manner so as to properly orientate the internal components of the latter.

c. Deficiencies of Prior Orthotic Inserts

Orthotic inserts have been formed of many different materials, including acrylic plastic, leather, metal, and foam rubber, for example. One construction which has proven extremely successful in recent years is a composite material insert formed of fiberglass and graphite fiber in resin.

An exemplary orthotic insert having the latter construction is disclosed in U.S. Pat. No. 4,439,934, the inventor of which is the same as of the present invention. The insert is fabricated by placing layers of fiberglass, resin, and graphite fiber upon a positive cast. The first layer is a continuous sheet constructed from a cloth such as fiberglass or nylon mesh and impregnated with resin. The second layer is a continuous sheet of graphite with the woven graphite fibers preferably running diagonally. The next layer is also a glass and resin continuous sheet, and then another graphite continuous sheet is added with the woven graphite fibers running orthogonally. Finally, there is a bottom layer which may be a glass and resin continuous sheet similar to the top layer. The assembly is heat cured to provide a bonded structure, and is trimmed to the desired size and shape by cutting and grinding.

Orthotic inserts having this construction are very strong, yet extremely lightweight and relatively thin. In practice, however, it has been found that they exhibit a number of deficiencies. Firstly, devices of this type have been prone to develop serious cracking with extended use. The cracks usually develop along the medial and lateral (i.e., side) edges of the insert and, once established, quickly propagate and destroy the device. It has also been observed that the cracks sometimes occur in the toe or heel areas and extend longitudinally into the structure.

As part of the present invention, Applicant has discovered the unexpected source of this problem. It has been found that the serious cracks initiate at the sites of tiny, often microscopic "microcracks" which are formed along the edges of the device during the cutting and grinding phases of the manufacturing process; a great multiplicity of these microcracks are formed all along the edges of the device during final shaping and finishing. It has been found that those along the side edges are the most likely to enlarge, apparently due to the sagittal plane (i.e., end-to-end) bending to which the device is subjected as the person walks. However, the cracks may also propagate longitudinally in the heel and toe areas as a result of frontal plane flexing or "cupping" of the device.

As part of the present invention, Applicant has discovered that the severity of the cracking problem which is experienced by such composite material inserts stems primarily from the fact that, once the cracks start in the graphite fiber material, they propagate with extreme speed. Thus, even though the flexible fiberglass layers have been found to be far more resistant to cracking, their integrity is also destroyed once the associated graphite layer begins to break.

Another deficiency of such prior devices is that they have offered relatively little flexibility in terms of allowing the rigidity or other characteristics of the insert to be adjusted to satisfy the requirements of a specific foot. At the time of their introduction, composite material inserts having the construction described above represented a significant advance in this respect. However, the adjustments could only be made in the most general sense: By varying the orientation of the graphite sheets so that the fibers extended in various directions, the overall rigidity of the structure (or possibly in certain generalized areas) could be adjusted; also the rigidity of certain areas could be increased by thickening the structure, although this had the disadvantage of increasing the thickness of the plate itself. In short, the construction of the prior devices has offered little opportunity for "fine-tuning" of rigidity/flexibilty and other control characteristics in specific areas where this may be needed to satisfy the requirements of a particular foot.

Accordingly, there has existed a need for a composite material orthotic constructed of layers of fiberglass and graphite fiber material which minimizes or eliminates the problem of cracks developing over a period of extended use. Moreover, there is a need for such a construction which permits the rigidity and other control aspects of the insert to be readily tailored to satisfy the specific needs of a person's foot, and particularly for allowing this to be done without necessitating a substantial increase in the thickness of the device. Still further, there is a need for such an improved orthotic which lends itself to being made by a relatively quick, convenient, and economical method.

SUMMARY OF THE INVENTION

The present invention has solved the problems cited above. Broadly, this is a blank for an orthotic insert, comprising a fiberglass/resin base layer having heel and forefoot ends and medial and lateral edges, and at least one graphite fiber/resin layer, the graphite fiber/resin layer being configured to impart a first degree of rigidity to a first portion of the blank, and a second degree of rigidity to a second portion of the blank. The fiberglass/resin layer and graphite fiber/resin layer are bonded together to form a unitary structure which is generally contoured to fit a plantar surface of a person's foot, so that the first and second portions of the blank having the first and second degrees of rigidity support first and second portions of the foot so as to provide control over the motions thereof.

Preferably, the graphite fiber/resin layer may comprise a first graphite fiber/resin layer having a first predetermined degree of rigidity which is bonded to the fiberglass/resin base layer so as to be positioned beneath the first portion of the foot, and a second graphite fiber/resin layer having a second predetermined degree of rigidity which is bonded to the base layer so as to be positioned beneath the second portion of the foot. The first graphite fiber/resin layer may comprise a relatively wide main reinforcement layer which extends through a central portion of the fiberglass base layer so as to impart the first degree of rigidity thereto. The second graphite fiber/resin layer may comprise at least one relatively narrow reinforcement strip which extends in a generally longitudinal direction proximate to one of the edges of the device so as to be positioned beneath an edge of the person's foot. Preferably, the second graphite fiber/resin layer may comprise first and second relatively narrow reinforcement strips which are spaced apart across the central portion of the base layer and extend proximate to the medial and lateral edges of the base layer so as to be positioned beneath the medial and lateral sides of the foot. Preferably, the first and second reinforcement strips are positioned so as to extend beneath and generally parallel to the first and the fifth rays of the foot.

The main reinforcement layer which extends across the central portion of the base layer may have a slot opening at its rearward end. The slot opening surrounds a center of the heel cup portion of the blank, so as to minimize the thickness of the blank under the heel of the person's foot, and so as to enable rearward ends of the main reinforcement layer to deform independently around the slot opening so as to conform to the curvature of the heel cup.

Preferably, a selected edge portion of the fiberglass/resin base layer extends outwardly beyond an edge portion of the graphite fiber/resin layer so as to form a substantially graphite-fiber free fiberglass border, the border having a width which is sufficient to prevent microcracks which are formed along the outer edge thereof from propagating into the graphite fiber/resin layer. There may be first and second such borders, extending along the medial and lateral edges of the base layer so as to prevent the microcracks from propagating into the graphite fiber/resin layer due to sagittal plane bending of the blank. There may also be borders extending across the ends of the base layer so as to prevent the microcracks from propagating due to frontal plane bending of the device.

A method is also provided for forming a blank for an orthotic insert, which method comprises the steps of (i) forming a fiberglass/resin base layer having heel and forefoot ends and medial and lateral edges, (ii) forming at least one graphite fiber/resin layer which is configured to impart a first degree of rigidity to a first portion of the blank and a second degree of rigidity to a second portion of the blank, and (iii) bonding the fiberglass/resin layer and the graphite fiber/resin layer together to form a unitary structure which is generally contoured to fit a plantar surface of a person's foot, so that the first and second portions of the blank having the first and second degrees of rigidity support first and second portions of the foot so as to provide control over the motions thereof.

The method may include the steps of positioning the graphite fiber/resin layers on the fiberglass resin base layer so as to form a layup assembly, positioning the layup assembly in contact with a mold having a contour which generally matches the plantar surface of a person's foot, and heating the mold and layup assembly so that the layers deform to match the contour of the mold, and so that the resin portions of the layers flow together and unite so as to bond the layers together in a unitary structure.

The method may further comprise the steps of continuing heating of the mold and layup assembly at a predetermined temperature and for a predetermined period of time which are sufficient for full curing of the resin portions of the layers, and then cooling the layup assembly so that the fully cured resins harden and the unitary structure permanently retains a contour which matches that of the mold. Alternatively, the method may further comprise the steps of continuing heating of the mold and layup assembly at a first predetermined temperature and predetermined time which are sufficient for only partially curing the resin portions of the layers, cooling the layup assembly so that the partially cured resin portions harden and produce a unitary structure which temporarily retains a contour matching that of the mold, comparing the unitary structure to a contour of a plantar surface of said person's foot, reshaping the unitary structure to have a contour which matches that of the person's foot to which the structure has been compared, heating the unitary structure at a second predetermined temperature and predetermined period of time which are sufficient to achieve full curing of the resin portions, and cooling the unitary structure so that the fully cured resin portions harden and the unitary structure permanently retains a contour which matches that of the person's foot.

BRIEF DESCRIPTION OF THE DRAWINGS

FIG. 6b is a top plan view illustrating the rotation of the person's pelvis during that portion of the gait cycle illustrated in FIG. 7a;

FIG. 8 is an isometric view of a composite material blank for an orthotic insert in accordance with the present invention, with the view being taken from a location looking from the side and downwardly toward the bottom surface of the blank in an inverted position;

FIG. 9 is an exploded view of the blank of FIG. 1, showing the fiberglass and graphite fiber layers which are bonded together to form this structure;

FIG. 10 is a bottom plan view of the blank of FIG. 8, illustrating the disposition of the fiberglass and graphite layers relative to the calcaneus and medial and lateral rays of the user's foot;

FIG. 11 is an isometric view of the flat, unformed layers of fiberglass and graphite fiber fabric arranged in the desired configuration and disposed between convex and concave molds for bonding together by heat curing;

FIG. 12 is a diagrammatical view of the graphite layers which are incorporated in the blank of FIGS. 8–11, indicating the various directions in which the graphite fibers may be oriented;

FIG. 13 is a bottom plan view, similar to FIG. 10, showing a blank for an orthotic insert in accordance with the present invention, in which the graphite fiber layers are recessed from the medial, lateral, and metatarsal edges of the device so as to provide a protective fiberglass border which prevents microcracks from propagating into the graphite fiber layer;

FIG. 14 is a bottom plan view similar to FIG. 13, showing an embodiment in which the graphite fiber layers are recessed from all edges of the device, so as to provide a protective fiberglass border which extends continuously around the entire perimeter of the blank;

FIG. 15 is a bottom plan view similar to FIGS. 13–14, showing an embodiment in which the graphite fiber layer extends annularly around the heel cup of the device so as to maximize the stiffness thereof for use in ski boots and other specialized applications; and FIG. 16 is an enlarged view of the medial edge of the device of FIG. 14, showing how the fiberglass border prevents microcracks which are formed during the finishing process from extending into the graphite fiber layers.

DETAILED DESCRIPTION a. Overview

Figure 1:
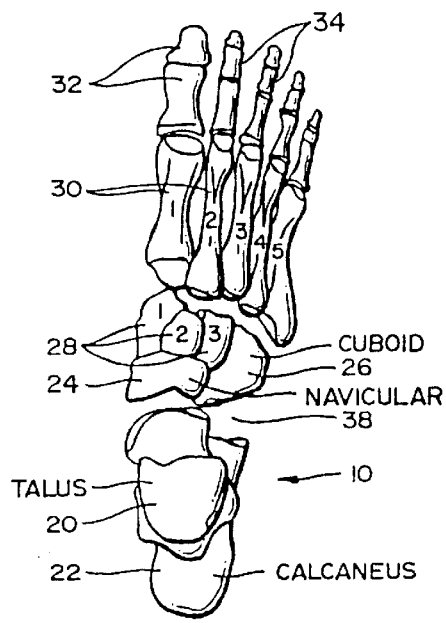
FIG. 1 is a top plan view of the skeletal structure of a person's right foot, with certain components of the foot being separated from one another for purposes of illustration.
Figure 2:
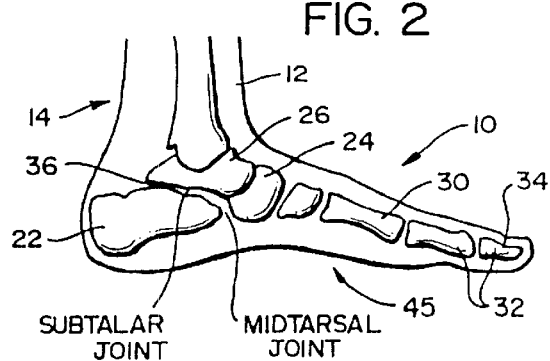
FIG. 2 is a side elevational view looking toward the inside of a person's left foot, with the outline of the foot and lower leg being shown as a shaded area.
Figure 3:
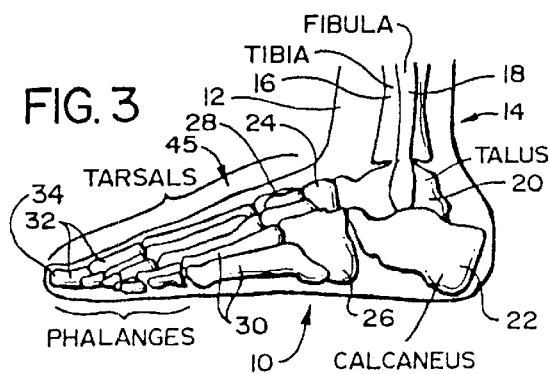
FIG. 3 is a view similar to FIG. 2, but looking towards the outside of the person's foot.
Figure 4A:
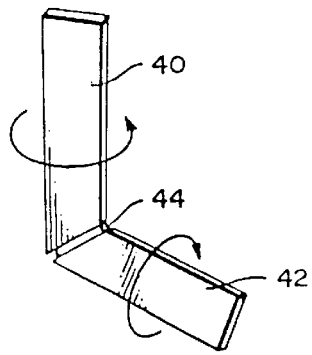
FIGS. 4a and 4b are perspective views illustrating schematically the rotational movements of the talus and calcaneus of a person's right foot about the subtalar joint.
Figure 4B:
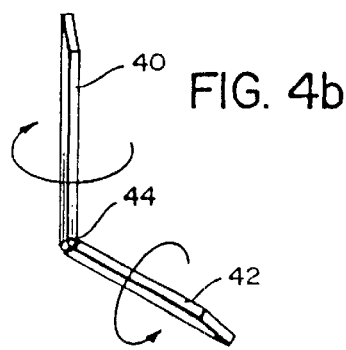
Figures 5A, 5B:
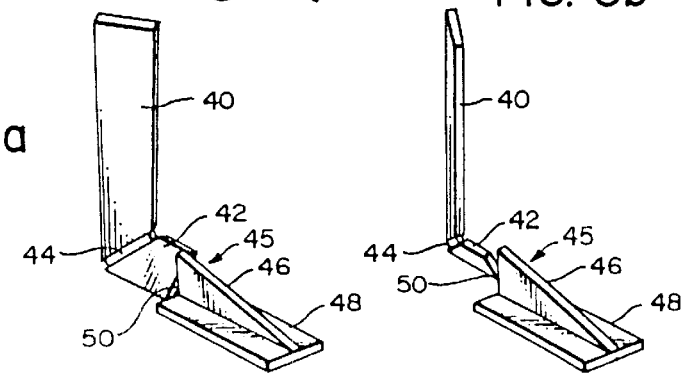
FIGS. 5a and 5b are schematic views similar to those of FIGS. 4a–b, but further illustrating the relative movement between the calcaneus and the midfoot about the midtarsal joint.
Figure 6A:
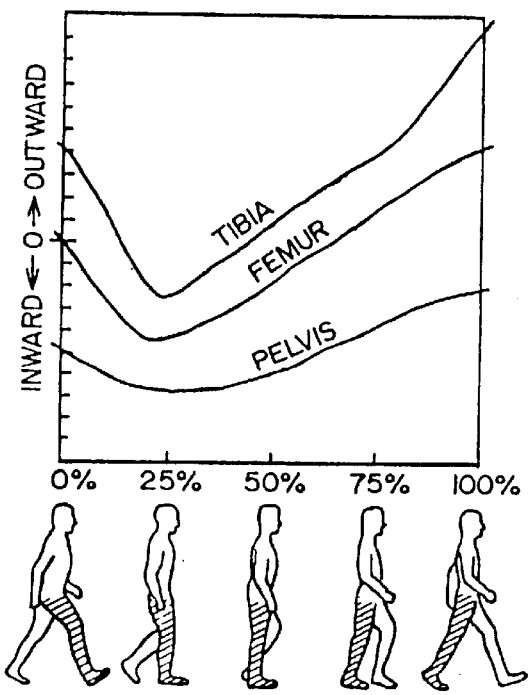
FIG. 6a is a graph illustrating the rotational movement of the pelvis, femur, and tibia during one-half of a gait cycle.
Figure 6B:
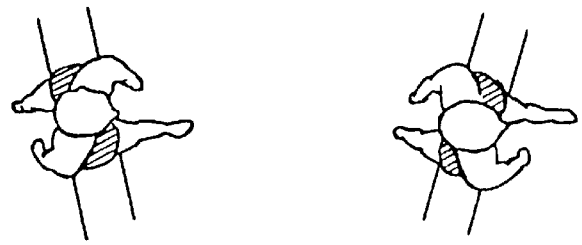
Figure 7A:
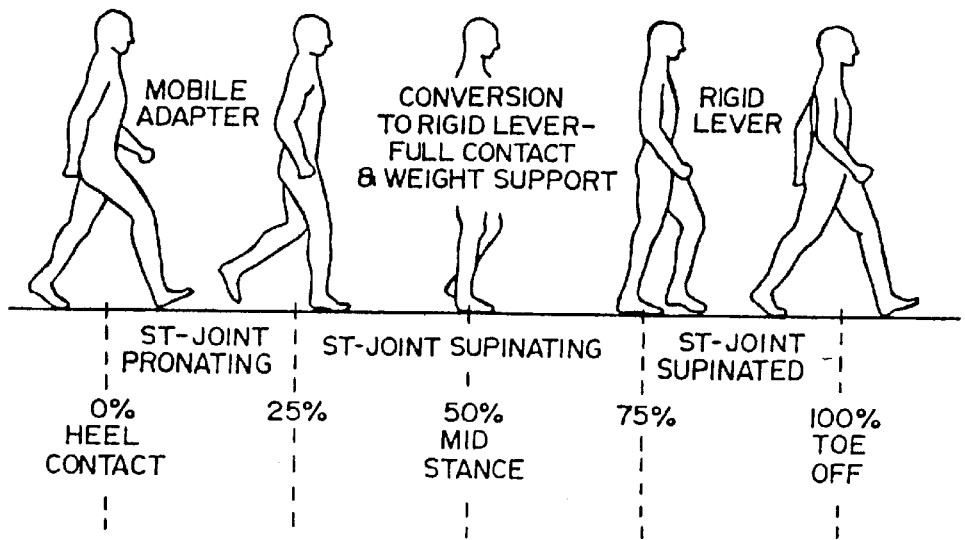
FIG. 7a is a graph similar to FIG. 6a, but illustrating the timing of the pronating and supinating motion of the leg and foot through one-half of a gait cycle.
Figure 7B:
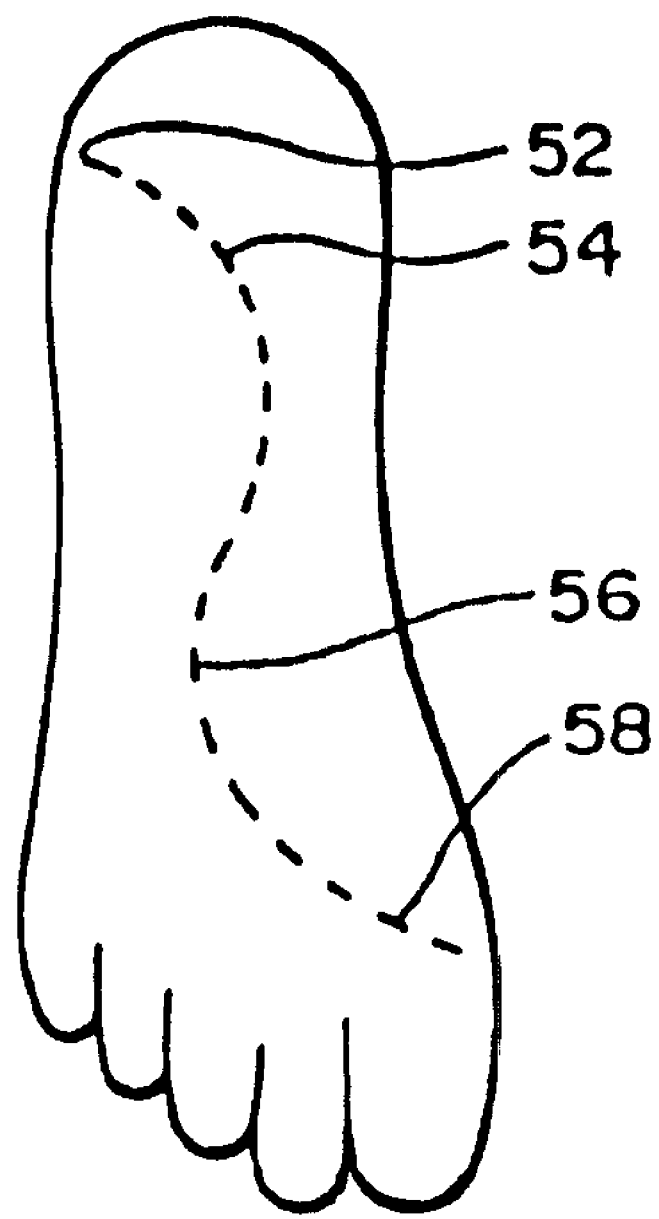
FIG. 7b is a view looking upwardly toward the plantar surface of a person's left foot, and illustrating the location of the center of pressure throughout the portion of the gait cycle which is illustrated in FIGS. 6a and 7b.

Referring to the drawings in detail, wherein like reference numerals represent like parts throughout, reference numeral 100 refers to a rigid, composite material blank which is configured in the outline of the plantar surface of a person's foot. The blank 100 is shown in the inverted position with its generally convex bottom surface 102 positioned upwardly, and its generally concave top surface (not shown) disposed downwardly; it will be understood that, when in use, the concave top surface of the device will normally be disposed upwardly to receive the bottom of the person's foot. It will also be understood that the rigid blank 100 will in many embodiments serve as the main structural member of an orthotic insert which incorporates other elements in its construction, and in particular may be covered with a layer of resilient cushioning material for the comfort of the wearer.

The blank 100 is an elongate structure having a forward edge 104 which is configured to lie proximate to the metatarsal head area of the wearer's foot, and a rearward edge 105 which generally surrounds a heel cup 106. Along its sides, the device is bordered by medial and lateral edges 108, 110.

The composite material blank 100 appears in FIG. 8 in its fully assembled configuration, in which the graphite fiber and fiberglass layers are permanently bonded together to form a unitary structure. However, for the purpose of describing the elements of this structure, reference is made to the exploded view of FIG. 9. As can be seen, the primary structural member or "foundation" of the assembly is provided by a fiberglass/resin base layer 112 which conforms generally to the outline of the wearer's foot and the interior of the shoe. As was noted above, this fiberglass layer is relatively soft and flexible.

Strength, rigidity, and control characteristics, in turn, are imparted by the graphite fiber/resin layers. As can be seen in FIG. 9, the first of these is a main reinforcement layer 114. The primary purpose of this member is to impart a degree of strength and rigidity to the blank as a whole, while leaving enough flexibility to permit further adjustment and "tuning" of the rigidity and control characteristics by the addition of supplemental strengthening members in specific areas. For reasons which will be discussed below, the medial and lateral edges of the reinforcement layer 114 are recessed inwardly from the medial and lateral edges of the fiberglass base layer 112, and a U-shaped cutout or slot 115 is provided in the region of the heel cup.

In the embodiment which is illustrated, the main reinforcement layer is supplemented by medial and lateral graphite fiber reinforcement strips 116, 118, which serve to provide additional rigidity and control under the medial and lateral rays of the user's foot. Finally, medial and lateral graphite fiber heel reinforcement strips 120 and 122 are bonded over the rearward ends of the main reinforcement strips, and serve to provide additional rigidity in the area of the heel cup. As will be described in greater detail below, one or more of these reinforcement strips may be deleted, or additional strips may be added, as may be desired for a particular application; moreover, the graphite fiber/resin material and/or the orientation of its fibers may be selected in such a manner as to vary the rigidity of each strip relative to the loading which is imposed by the user's foot.

The edges of the various graphite-fiber layers are recessed inwardly from the boundaries of the fiberglass foundation layer 112 so as to form "clear" fiberglass borders 124, 126 along the edges of the device. As will be discussed below, this construction renders the edges of the device relatively soft and flexible, enhancing wearer comfort, and also prevents microcracks which are formed during the finishing of the device from propagating into the graphite fiber layers.

b. Structural Features

The relationship of the various components in the finished device is more clearly shown in FIG. 10. As can be seen, the main graphite fiber reinforcement layer 114 extends substantially the full length of the device, but is recessed inwardly from the edges of the fiberglass layer so as to form the "clear" (i.e., substantially graphite-fiber free) fiberglass borders. The two ends 128, 129 of the reinforcement layer adjacent the heel slot 115 are preferably rounded off as shown (e.g., see FIG. 8); not only does this provide a more pleasing appearance to the finished device (if this structure is to be visible through a translucent resin), but more importantly it helps prevent cracks from developing in this area by eliminating any perpendicular joints between the borders of the graphite layer and the outer edge of the device. In the exemplary embodiment which is illustrated, the main reinforcement layer is formed by a sheet of graphite fiber material about 2½" wide and about 6½" long, both of these dimensions being at least partly dependent on the size of the wearer's foot and hence the size of the finished device.

The slot 115 in the heel area of the reinforcement layer extends around the center of the heel cup, as indicated at 130. This feature provides the device with several significant advantages: firstly, this creates an area of somewhat increased flexibility beneath the calcaneus, allowing a degree of controlled motion of the heel in some embodiments, in the form of frontal plane cupping of the device as the medial and lateral sides of the heel cup flex inwardly and outwardly; secondly, since only the fiberglass foundation layer is present beneath the center of the heel cup, and the graphite fiber layer is not, the thickness of the device is minimized in this area, which enhances wearer comfort and makes it much easier to achieve a proper fit in a conventional shoe; thirdly, the cutout 115 enables the rearward ends 132, 134 of the graphite-fiber layer to bend toward one another independently as the heel cup is formed, making proper lay-up and molding of the device much easier. In the exemplary embodiment which is illustrated, the slot 115 extends approximately ⅜" on either side of the center of the heel cup and ½" forwardly thereof.

The next graphite-fiber layer comprises the medial and lateral graphite fiber reinforcement strips 116, 118. As is shown, these generally overlie the medial and lateral edges of the main reinforcement layer 114, although (as indicated by dotted line image 136) the two edges do not necessarily line up exactly, depending on the construction and control characteristics which are desired. Preferably, the two reinforcement strips 116, 118 are splayed slightly, so that they converge toward the heel end and diverge toward the toe. Referring back to FIG. 1 and then to FIG. 10, it will be seen that this serves to position the reinforcement strips 116, 118 so that they extend parallel to and beneath the long axes of the first and fifth rays of the foot, as indicated by dotted line images 140, 142. This provides additional support under these high-load areas as the person's foot goes through a normal gait cycle, and the use of separate reinforcement strips for the medial and lateral rays means that the rigidity and control characteristics in these areas can be adjusted independently to meet the specific requirements of an individual foot. In many applications, it is desirable to make the area under one of the rays either more flexible or more rigid than under the other: not only may this be desirable for correcting a functional deficiency of the foot, but it is also advantageous in connection with certain athletic applications, such as, for example, in devices for basketball shoes or ice skates. In the exemplary embodiment which is illustrated, strips approximately ⅝" wide and about equal in length to the main reinforcement layer have been found to provide suitable rigidity and control characteristics.

The rigidity provided by the individual reinforcement strips can be varied in a number of ways. For example, the strip may be made up of one or more layers of graphite-fiber material, and the material may be selected to have a particular degree of strength or rigidity. Furthermore, as will be discussed in greater detail below, the orientation of the graphite fibers can be adjusted relative to the long axis of the foot so as to vary their resistance to frontal and/or sagittal plane bending.

Toward the heel end of the device, the reinforcement strips 116, 118 converge somewhat (extending rearwardly in line with the rays of the foot), so that their rearward ends flank the heel cup. The reduced span between the strips in this area imparts additional strength and rigidity to the heel cup. For the reasons discussed above, control of heel position during the gait cycle is critical to the proper functioning of the foot, and this configuration makes it possible to achieve the desired degree of control without having to build up an excessively thick structure beneath the calcaneus.

Finally, the medial and lateral heel reinforcement strips 120, 122 overlie the rearward portions of the main reinforcement strips 116, 118, preferably extending in line with the latter. The separate heel reinforcement strips serve to provide still more strength and rigidity in the area of the heel cup, and to further increase the degree of adjustability or "tuning" which is available to the practitioner. As with the main reinforcement strips 116, 118, strips 120, 122 can be varied in number, thickness, material, or orientation to provide whatever degree of rigidity is desired on either side of the heel cup. Moreover, the reinforcement strips 120, 122 extend from adjacent the heel cup to forward ends which lie near the arch area of the device, and by varying the strength of these strips, rigidity in this portion of the device can be adjusted as well.

The combined width of the graphite-fiber reinforcement strips is preferably significantly less than the overall width of the main reinforcement layer 114, so that the strips extend down the edges of the device while a relatively broad central section 138 remains free of additional reinforcement. This has the advantage of providing the greatest rigidity and reinforcement where it is most needed (i.e., under the medial and lateral rays of the foot and adjacent to the heel cup), while leaving the area down the center of the device with more strength than would be provided by unreinforced fiberglass, but still flexible enough to bend as necessary for control functions and user comfort. For example, in the exemplary embodiment which is illustrated, the reinforcement strips are about ¾" wide, leaving an open span about 1–1⅜" wide across the middle of the device.

FIG. 10 also shows that the combined width of the graphite-fiber layers is significantly less than the overall width of the fiberglass foundation layer 112, leaving the "clear" fiberglass borders 124, 126 along the medial and lateral edges of the device. This configuration provides the device with several important advantages. Firstly, because the unreinforced fiberglass is much more flexible than that which is reinforced with the graphite-fiber material, the medial and lateral edges of the insert are rendered relatively "soft" without compromising the overall strength of the device; this greatly enhances wearer comfort, since the soft edges will flex somewhat where they engage the edges of the user's foot and the inner surfaces of the shoe. Secondly, the "clear" borders 124, 126 prevent microcracks which are formed during the finishing of the insert from propagating into the graphite fiber layers of the device; this aspect of the present invention will be described in greater detail in Section (d) below.

c. Materials and Fabrication

FIG. 11 illustrates schematically the manner in which the blank 100 is constructed from sheets of fiberglass and graphite fiber material.

As can be seen, the flat, unformed layers and strips of material are layered on top of one another to form a generally planar layup assembly 150. As originally supplied, the resin in these layers is soft and uncured, so that the materials are very soft and pliable. The layers 112, 114, 116, 118, 120, and 122 can therefore be cut from sheets of the appropriate materials and then placed on top of one another to form an assembly 150 which will readily deform when subjected to pressure.

Flexible fiberglass/resin and graphite-fiber/resin sheet materials which are suitable for forming the layup assembly 150 are known to those skilled in the art, and include the following examples: Graphite Fiber material —Product No. TXX145-12-F185-14, available from Hexel Corporation, 5794 W. Positas Blvd., Pleasanton, Calif., 94588-8781. Fiberglass Material —Product No. 7781-38F185-11, available from Hexel Corporation, Pleasanton, Calif. Also, although the fiberglass materials which have been described are generally preferred in terms of both performance and economic factors, it will be understood that the term "fiberglass" as used herein is intended to include these and similar matrices which are substantially free of graphite fibers, but which may incorporate other suitable fracture-resistant fiber reinforcement materials in addition to or in place of glass fiber.

The rigidity of the graphite fiber reinforcements may be adjusted by employing graphite fiber materials of varying thicknesses, widths, and fiber qualities/densities. Adding (i.e., stacking) additional layers can also be employed to increase rigidity. Still further, the rigidity can be adjusted by orienting the graphite layers so that the fibers run in various directions, as is illustrated in FIG. 12. If the graphite layer is configured with the graphite fibers running horizontally, as seen at 152, then the strip or layer will tend to flex more readily about the axis parallel to the fibers, line C. Similarly, the fibers can be arranged in any direction to create a series of axes about which the material will flex more readily, as seen at 154, 156, and 158 in FIG. 12. Thus, the arrangement and configuration of the fibers relative to themselves and relative to the fiberglass layer or layers can determine the amount and direction of the flexibility/rigidity of various regions of the completed device.

To form the blank, the pliable layup assembly 150 is placed between molds 160, 162 and subjected to heat in a vacuum, autoclave, or other pressure blanket. The convex and concave molds 160, 162 may be positive and negative dies corresponding to an individual user's foot; if desired, however, the molds may be of a more "universal" nature, for forming standardized devices which are generally suitable for feet within a predetermined range of sizes or shapes, or for forming a standardized blank which is subsequently remolded for a specific user's foot, as will be described in greater detail below. The molds themselves may be formed as positive molds, such as plaster casts taken from the patient's feet or based on idealized shapes, or molds which are computer-generated and/or machined (e.g., by means of a CAD-CAM process) from measurements or other data.

Positive force, such as mechanical, electromechanical or hydraulic pressure, is applied to press the layup assembly into conformance with the convex and concave engagement surfaces 164, 166 of the two mold halves. The heat, in turn, causes the molten resins in the layers to intermingle and become permanently bonded together. As this is done, the various strips and layers are pressed into one another, ensuring that the thickness of the device is both uniform and minimized (as compared with a structure in which the layers are simply stacked up on top of one another), and thereby providing the smooth, continuous surface which is seen in FIG. 8.

Heating of the lay-up assembly continues at a temperature and for a period of time which are specified by the manufacturer of the materials, followed by a period of cooling, resulting in the resins in the several layers curing and forming a semi-rigid matrix. Thus permanently bonded together, the graphite fiber and fiberglass layers cooperate form a unitary structure having relatively more rigid and more flexible areas, as has been described above.

After curing the now rigid assembly is trimmed to provide a device having the desired outline, as indicated by dotted line image 168 in FIG. 11. As this is done, the edges may be tapered or "feathered" somewhat by grinding, in order to provide greater flexibility and a smooth transition where the device meets the foot and sides of the shoe. Also, as was noted above, a soft, resilient top cover and/or additional structural features such as a heel post may then be mounted to the rigid blank.

As a part of the present invention, it has been found that the above process can be carried out successfully in at least two separate phases, and at different locations, which is highly advantageous in several respects. In particular, it has been found that the assembled fiberglass and graphite layers can be initially heat molded for a limited period which is significantly less than that which is required for the resins to fully cure and harden. Thus, when the first phase of the process is completed, the various layers will be bonded together in the correct orientation/relationship, and the device will have a semi-permanent shape which corresponds at least roughly to that of the patient's foot. At the same time, the device will remain somewhat soft and deformable (in some embodiments, at a somewhat elevated temperature) so as to permit subsequent re-shaping. Using the materials described above, an initial "set" of approximately 80% of the total time specified by the manufacturer for fully curing the material at a given temperature has been found suitable.

Thus, the devices can be produced at the factory where access to bulk materials and mass-production techniques are available, and can then be shipped in semi-finished form to podiatrists and other health practitioners in the field. There, the initial shape of the device assists the practitioner in positioning it relative to the patient's foot, with the strengthening strips and other elements in the proper orientation. The practitioner can then re-shape the device based on his observations/measurements made locally, for example, by means of a cast which the practitioner has taken, or in some embodiments by forming to the plantar surface of the person's foot itself. In some embodiments, the device may be softened somewhat by warming prior to being re-shaped. After the final shape has been achieved, the device is heated for the balance of the time necessary to achieve full curing, so that the desired contour will be permanently retained.

Even where production takes place entirely within a single facility, the two-phase process offers significant advantages from the standpoint of production efficiency. This is because the initial molding can be conducted rapidly using standardized and/or automated techniques, and the initial shape of the devices reduces the amount of time and manpower which is required for the final/custom molding phase. Moreover, the initial shaping reduces production errors, by helping to ensure proper alignment of the device during final shaping.

d. Crack-Prevention Border

As was noted above with respect to FIG. 10, the orthotic blank 100 of the present invention is preferably provided with "clear" fiberglass borders along its edges to prevent cracks from propagating into the graphite fiber/resin layers. In the embodiment which is shown in FIG. 10, only the medial and lateral sides of the device are provided with these borders, being that these are the regions most prone to cracking due to end-to-end bending of the device (sometimes referred to herein as "sagittal plane bending") as the foot goes through the gait cycle. However, borders may also be provided to protect against cracking in the toe and/or heel ends of the device, being that in some embodiments there will be a degree of side-to-side flexing around the longitudinal axis of the orthotic (sometimes referred to herein as "frontal plane bending") as well.

FIGS. 13 and 14 show embodiments of the present invention which are particularly configured to protect the graphite fiber layers from such cracking in the end areas. In particular, FIG. 13 shows a blank 170 having a clear fiberglass border 172 which extends across the forward end of the device, as well as medial and lateral crack prevention borders 174, 176. Similarly, in the embodiment which is illustrated in FIG. 14, the blank 180 is provided with both heel and toe end borders 182, 184, in addition to the medial and lateral borders 186, 188, so that a continuous crack-prevention border is formed around the entire perimeter of the device. The borders are all of sufficient width to prevent microcracks from extending into the graphite fiber layers, although the actual width may vary somewhat (as shown) depending on factors such as the anticipated degree of stress and bending in a particular area and the amount of flexibility desired.

FIG. 15 shows an embodiment of the present invention which is generally similar to those illustrated in FIGS. 13–14, except that the main graphite-fiber reinforcement layer 192 is provided with a closed-perimeter, generally circular or oval opening 194 in the center of the heel cup area, in place of the open-ended slot 115 which was described above. As a result, an annular band 196 of graphite reinforcement material extends around the entire lip of the heel cup, rendering this structure very tough and rigid. This configuration is particularly useful for orthotic devices which are intended for use in ski boots and similar footwear (e.g., skate boots) in which the user's foot is immobilized, in that the rigid structure very rapidly transfers even the slightest rotation of the user's leg into rotation of the device and boot; for example, this provides the skier with superior edge control and other enhanced control characteristics. Any flexing or "cupping" of the device in this area is also eliminated by the rigid structure, but this flexibility is unneeded in a ski boot because, unlike the embodiments described above, there is no gait cycle involved and hence no heel-strike shock to be absorbed. The reinforcement layer 192 is also more difficult to lay up than that those which have an open-ended slot at the heel, but this configuration is still easier to work with than a graphite sheet with no opening at all, and the thickness under the heel is also kept to a minimum.

FIG. 16 provides an enlarged view of the portions of the crack-prevention border and associated graphite fiber layers which are indicated in FIG. 14. As can be seen, a multiplicity of microcracks 198 (often microscopic in size) are formed along the edges of the device during the trimming and grinding process. However, the protective fiberglass border 186 is of sufficient width that none of these extends into the base graphite fiber layer 114 or into the reinforcement strips 116, 118; for example, borders approximately $\frac{1}{8}"-\frac{1}{2}"$ wide along the medial and lateral edges of the device have been found sufficient, although significantly narrower or wider borders may be used depending on the nature of the materials, the stresses to which the device is to be subjected, and the degreee of flexibility which is desired. Since the microcracks will not propagate and extend in the fiberglass material, the borders effectively eliminate cracking of the device, ensuring a greatly extended service life.

Having thus described the present invention in its preferred embodiments, it should be understood that numerous modifications and adaptations may be resorted to without departing from the spirit thereof. Accordingly, the present invention is not to be limited except as by the appended claims.

What is claimed is:

1. A method for forming a blank for an orthotic insert, said method comprising the steps of:

forming a fiberglass-resin base layer having a heel end, a forefoot end, and medial and lateral sides;

forming at least one graphite fiber-resin reinforcement layer;

positioning said graphite fiber-resin reinforcement layer on said fiberglass-resin base layer so that medial and lateral edges of said reinforcement layer will be spaced inwardly from finished medial and lateral edges of said blank so as to form clear borders of said fiberglass-resin base layer between said medial and lateral edges of said graphite fiber-resin reinforcement layer and said medial and lateral edges of said blank, said clear borders each having a width sufficient to prevent microcracks formed in trimming of said fiberglass-resin base layer from reaching and propagating into said graphite fiber-resin reinforcement layer;

bonding said fiberglass-resin base layer and said graphite fiber-resin reinforcement layer so that resin matrixes thereof join together and said layers form a unitary structure for engaging a plantar surface of a person's foot; and trimming said fiberglass-resin base layer along said edges thereof so as to form said finished medial and lateral edges of said blank.

2. The method of claim 1, further comprising the steps of:

positioning said graphite fiber-resin reinforcement layer on said fiberglass-resin base layer so that said a forward edge of said reinforcement layer will be spaced inwardly from a finished forward edge of said blank so as to form a clear forward border of said fiberglass-resin base layer between said forward edge of said graphite fiber-resin reinforcement layer and said finished forward edge of said blank, said clear forward border having a width sufficient to prevent microcracks formed in trimming of said fiberglass-resin base layer from reaching and propagating into said graphite fiber-resin reinforcement layer; and trimming said fiberglass-resin base layer along said forefoot end thereof so as to form said finished forward edge of said blank.

3. The method of claim 1, further comprising the steps of:

positioning said graphite fiber-resin reinforcement layer on said fiberglass-resin base layer so that a rearward edge of said reinforcement layer will be spaced inwardly from a finished rearward edge of said blank so as to form a clear rearward border of said fiberglass-resin base layer between said rearward edge of said graphite fiber-resin reinforcement layer and said finished rearward edge of said blank, said clear rearward border having a width sufficient to prevent microcracks formed in trimming of said fiberglass-resin base layer from reaching and propagating into said graphite fiber-resin reinforcement layer; and trimming said fiberglass-resin base layer along said heel end thereof so as to form said finished rearward edge of said blank.

4. The method of claim 1, wherein the step of bonding said fiberglass-resin base layer of said graphite fiber-resin layer comprises:

pressing said fiberglass-resin base layer and said graphite fiber-resin reinforcement layer together in a mold so as to contour said blank to fit a plantar surface of a person's foot.

5. The method of claim 4, wherein the step of bonding said fiberglass-resin base layer and said graphite fiber-resin layer further comprises:

heating said base and reinforcement layers in contact with said mold so that molten resin components flow together to form a unified resin matrix.

6. The method of claim 1, wherein the step of trimming said base layer comprises:

grinding said fiberglass-resin base layer along said medial and lateral sides of said base layer.

7. The method of claim 6, wherein the step of positioning said graphite fiber-resin reinforcement layer on said fiberglass-resin base layer comprises:

positioning said reinforcement layer on said base layer so that said clear fiberglass-resin borders have a width in the range from about ⅛ inch to about ½ inch.

* * * * *